United States Patent [19]

Goldberg

[11] Patent Number: 5,209,452
[45] Date of Patent: May 11, 1993

[54] ERGONOMIC SUPPORT PLATFORM FOR PORTABLE COMPUTERS

[76] Inventor: Stephen Goldberg, 301 Race St. Unit 206, Philadelphia, Pa. 19106

[21] Appl. No.: 862,775

[22] Filed: Apr. 3, 1992

[51] Int. Cl.⁵ ............................................. F16M 1/00
[52] U.S. Cl. ................................. 248/676; 248/118; 248/174
[58] Field of Search ............... 248/176, 174, 676, 678, 248/441.1, 346, 918, 118, 118.3, 118.5; 400/718; 340/700

[56] References Cited

U.S. PATENT DOCUMENTS

| | | | |
|---|---|---|---|
| 2,584,352 | 2/1952 | Kern | 248/118.3 X |
| 4,044,980 | 8/1977 | Cummins | 248/676 X |
| 4,073,460 | 2/1978 | Dale | 248/174 |
| 4,482,064 | 11/1984 | Berke | 248/118 X |
| 4,830,328 | 5/1989 | Takach | 248/676 X |
| 4,913,390 | 4/1990 | Berke | 248/176 |
| 4,980,676 | 12/1990 | Nomura | 340/700 |
| 5,050,826 | 9/1991 | Johnston | 400/715 |
| 5,056,743 | 10/1991 | Zwar | 400/715 X |
| 5,100,098 | 3/1992 | Hawkins | 248/917 |

*Primary Examiner*—J. Franklin Foss
*Attorney, Agent, or Firm*—Caesar, Rivise, Bernstein, Cohen, Pokotilow, Ltd.

[57] ABSTRACT

A ergonomic support platform for portable computers. The platform is formed as an integral unit and has an angularly extending support portion for supporting the portable computer thereon so that its keyboard is at an ergonomically appropriate angle. The platform includes a wrist rest portion connected to a computer platform area by a front wrist rest bend and a front support bend. The wrist rest portion includes a planar surface disposed generally parallel to the support portion to elevate and support the hands of the user at an ergonomically appropriate position.

3 Claims, 1 Drawing Sheet

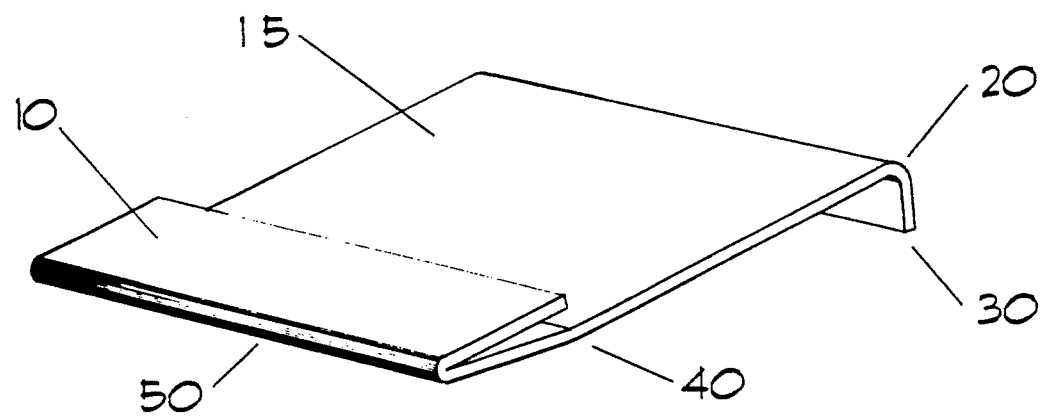
Fig 1 - Front Quarter View of LapLift
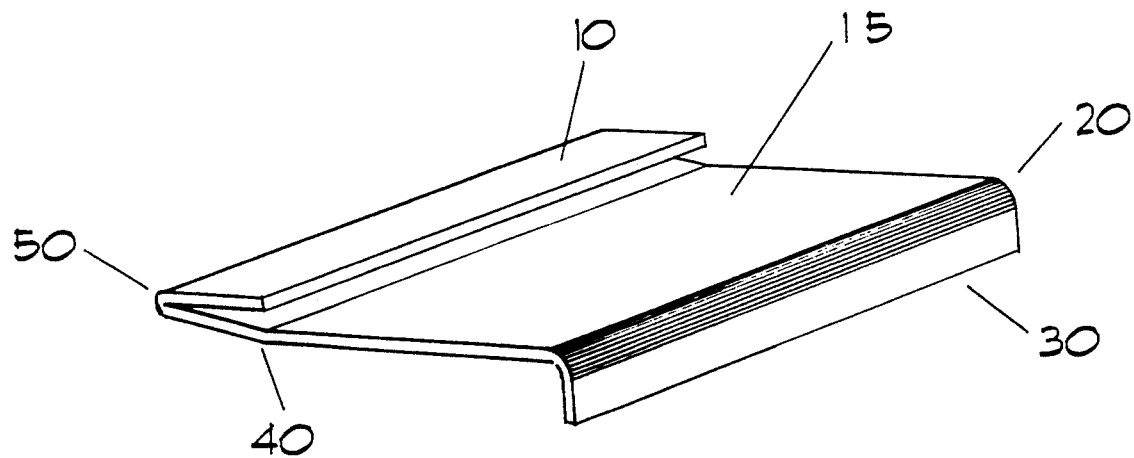
Fig 2 - Rear Quarter View of LapLift

ERGONOMIC SUPPORT PLATFORM FOR PORTABLE COMPUTERS

BACKGROUND OF THE INVENTION

Within the past five years, many types of portable computers have been developed. One style of these computers is the "clamshell" type, which opens like a book. The size of these computers (W×D×H) varies from approximately 15"×15"×2½" ("portable" size) to 12"×10"×2" ("laptop" size) to 11"×8½"×1½" ("notebook" size).

There are many types of wrist supports available for regular desktop computer keyboards which address ergonomic concerns such as carpal tunnel syndrome. Since the keyboard of most portable computers includes half the case thickness, the overall height to the tops of the keys is greater than on regular desktop computer keyborads. This increased height exaggerates the ergonomic issues of wrist support.

In the instance of portable computers, most do not have any type of rear legs which would allow the machine to be tilted at a comfortable typing angle. This is especially true of "laptop" size and "notebook" size machines. Once again, using the analogy of regular desktop computer keyboards, these keyboards uniformly have some method of typing angle adjustment, usually by some means of rear leg support.

One product which provides a partial solution is called the "Wrist Perch", manufactured by PC Compatibles, P. O. Box 46, Chappaqua, N.Y. 10514. This product is called a "foam ergonomic accessory", fits beneath the computer, and is designed only for "notebook" size computers. However, the wrist rest area on this product is only 1"front-to-back which is inadequate for proper support; the correct measurement is 3".

In addition, this product is made from closed-cell foam with a somewhat rough finish; after extended use, this surface can become abrasive and annoying to the touch. Further, this product is designed only for "notebook" size computers, and thereby ignores the many portable computers (both new and old) which are larger than "notebook" size computers.

There are no other products on the market which are designed to provide both wrist support and a typing angle support for portable computers. Also, there is no product on the market, the above example included, which provides both wrist support and a typing angle support for all sizes of portable computers.

OBJECTS OF THE INVENTION

Accordingly, it is the general object of this invention to provide an accessory for portable computers which combines a large wrist rest area with a typing angle support and fits all sizes of "clamshell" type computers;

It is another object of this invention to provide an accessory for portable computers which addresses ergonomic concerns such as carpal tunnel syndrome;

It is a further object of this invention to provide an accessory for portable computers which is made from a material that is smooth and pleasing to the touch, even after extended use;

It is still yet a further object of this invention to provide an accessory for portable computers which fits all sizes of "clamshell" type portable computers; and It is still yet a further object of this invention to provide an accessory for portable computers which will provide a new level of comfort for the computer user.

SUMMARY OF THE INVENTION

These and other objects of the instant invention are achieved by providing an accessory, in the form of a platform, for portable computers which is simple and inexpensive to manufacture, and therefore will have a low retail price. The platform is arranged for supporting a conventional portable computer on a horizontal surface to facilitate its use. The portable computer comprises a case having a bottom surface and a top surface including a keyboard.

The support panel of this invention is an integral member formed of a rigid material and comprising a computer support portion, a wrist support portion, and a leg portion. The computer support portion is planar, having a rear edge and a front edge and is configured for receipt of the bottom surface of the computer case thereon between the support portion's edges. The leg portion extends downward from the rear edge of the computer support portion and engages the horizontal surface, e.g., table, desk, etc.. The front edge also engages that horizontal surface, whereupon the computer support portion is inclined at a small acute angle to the horizontal surface so that said keyboard is disposed in an ergonomically desirable orientation.

The wrist support portion comprises first and second generally planar sections. The first section of the wrist support portion extends from the front edge of the computer support portion and at a large obtuse angle so that the first section extends at a small acute angle to said horizontal surface. The second section of said wrist support portion extends at a small acute angle to said first section thereof, whereupon the second section of the wrist support portion is disposed generally parallel to the computer support portion and at an ergonomically desirable height for supporting the wrist of the user of the keyboard.

DESCRIPTION OF THE DRAWING

Other objects and many of the attendant advantages of this invention will be readily appreciated as the same becomes better understood by reference to the following detailed description when considered in connection with the accompanying drawing wherein:

FIG. 1 is an isometric view showing the right front quarter of a portable computer platform constructed in accordance with this invention; and FIG. 2 is an isometric view showing the right rear quarter of the portable computer platform shown in FIG. 1.

DETAILED DESCRIPTION OF THE PREFERRED EMBODIMENT

Referring now in detail to the various figures of the drawing, wherein like reference characters refer to like parts, there is shown in FIG. 1 a portable computer platform constructed in accordance with this invention. The portable computer platform comprises a wrist rest portion 10 connected to a computer platform portion 15 by a front wrist bend 50 and a front support bend 40. The computer platform portion 15 is generally planar and sufficiently large to hold the bottom surface of the case of a portable computer (not shown) thereon. The typing angle, i.e., the angle of the keyboard's keys when the portable computer is in place on the platform portion 15 is created by the rear leg bend 20 terminating at a rear support edge 30 and by the front support bend 40. In particular, the rear support edge 30 and the undersurface of the front support bend 40 are each arranged to be disposed on a table, desk, or other flat surface on which the computer will be used to orient the planar computer support portion 15 at the desired typing angle. As can be seen in FIGS. 1 and 2 this typing angle is an ergonomically appropriate small acute angle.

The front support bend 40 forms the front edge of the platform portion 15, while the rear leg bend 20 forms the rear edge of the platform portion 15. The front wrist portion 10 extends from the front edge, i.e., support bend 40, of the computer platform portion 15 and includes a lower section extending at a large obtuse angle to the planar portion 15, and an upper section folded over the lower section, i.e., it is V-shaped when viewed from the side of the platform. The upper section of the front wrist portion 10 is generally planar and is oriented generally parallel to the planar computer support portion 15. The outer surface of the upper section forms the wrist and hand support for the user of the computer, and is at an ergonomically desirable height with respect to the computer's keyboard.

The free edge of the upper section of the front wrist portion forms a stop against which the front edge of the portable computer's case can rest when the portable computer is located on the support portion 15.

In accordance with a preferred embodiment of this invention the portable computer platform is thermo-formed as an integral unit from a continuous sheet of rigid foamed PVC sheet in 6 mm thickness. The brand used is Celtec®, manufactured by Vycom Corporation, Greenwood Avenue and Warner Street, Scranton, Pa. 18505. Celtec® contains no lead, cadmium, barium or zinc heat stablizers common to other PVC materials. Celtec® is made only with tin, which means there are no special health, environmental or waste disposal problems. However, the product can be manufactured from any thermoplastic capable of heat-forming into the desired shape, such as plexiglas, ABS plastic, high-impact polystyrene, etc.

Other methods of manufacturing the subject platform are possible, including casting from liquid resins, extrusion, and injection molding from appropriate materials. Preliminary investigations into these methods have determined that thermoforming from flat sheet using conventional strip-heating techniques is ideally cost-effective.

The computer support platform of this invention is preferrably manufactured by producing the three (3) bends 20, 40, and 50 in a pre-sized sheet of foamed PVC in locations determined by the size of the finished product which is in turn determined by the size of the portable computer to be accommodated. Prior to fabrication, the corners and edges of the pre-sized sheet of foamed PVC are beveled and sanded smooth for overall product safety.

The method of using the platform of the subject invention is to place the portable computer on computer platform portion 15, with the computer's front edge facing toward wrist rest portion 10. The portable computer can then be opened for operation. During computer use, the person using the computer places the heel of their hands on wrist rest area 10, and proceeds to operate the computer. The computer will be held in position by the contact of the rubber feet (usually located on the bottom surface of the computer's case) with the upper surface of the computer platform portion 15, and by the free edge of the wrist rest portion 10, should the computer attempt to slide down the surface of the platform portion 15.

As should be appreciated from the foregoing the ergonomic support platform for portable computers of this invention provides a more natural typing angle and a good support for the wrist, according to modern ergonomic recommendations for keyboard work. In addition, since the platform is light weight and not much bigger than the portable computer itself its use is not confined for a single location. Instead the platform may be easily carried when traveling with the computer. Furthermore, the platform of this invention has additional advantages in that it permits computer users to work for extended periods with reduced wrist strain. It provides a recognizable location for the computer amid normal desk supplies and it can increase the user's typing speed.

Although the description above contains many specifications, these should not be construed as limiting the scope of the invention but as merely providing illustrations of one of the preferred embodiments of this invention. For example, any or all of the bends can be replaced by a hinge which connects two otherwise unconnected halves, etc.

Without further elaboration, the foregoing will so fully illustrate my invention that others may, by applying current or future knowledge, readily adopt the same for use under various conditions of service.

I claim:

1. A support platform for supporting a portable computer on a horizontal surface to enable a user of said computer to comfortably use said computer, said portable computer comprising a case having a bottom surface and a top surface including a keyboard, said support platform being a integral member formed of a rigid material and comprising a computer support portion, a wrist support portion, and a leg portion, said computer support portion being planar, having a rear edge and a front edge and being configured for receipt of said bottom surface of said computer thereon between said edges, said leg portion extending downward from said rear edge and engaging said horizontal surface, said front edge also engaging said horizontal surface, whereupon said computer support portion is inclined at a small acute angle to said horizontal surface so that said keyboard is disposed in an ergonomically desirable orientation, said wrist support portion comprising first and second generally planar sections, said first section of said wrist support portion extending from said front edge of said computer support portion and at a large obtuse angle so that said first section extends at a small acute angle to said horizontal surface, said second section of said wrist support portion extending at a small acute angle to said first section thereof, whereupon said second section of said wrist support portion is disposed generally parallel to said computer support portion and at an ergonomically desirable height for supporting the wrist of the user of the keyboard.

2. The computer platform of claim 1 wherein said material forming said platform has a smooth surface.

3. The computer platform of claim 2 wherein said material comprises rigid foamed polyvinylchloride.

* * * * *